April 3, 1951  P. J. NELSON  2,547,407
APPARATUS FOR DETECTING METAL OBJECTS ON A MOVING BELT
Filed June 18, 1948  3 Sheets-Sheet 1
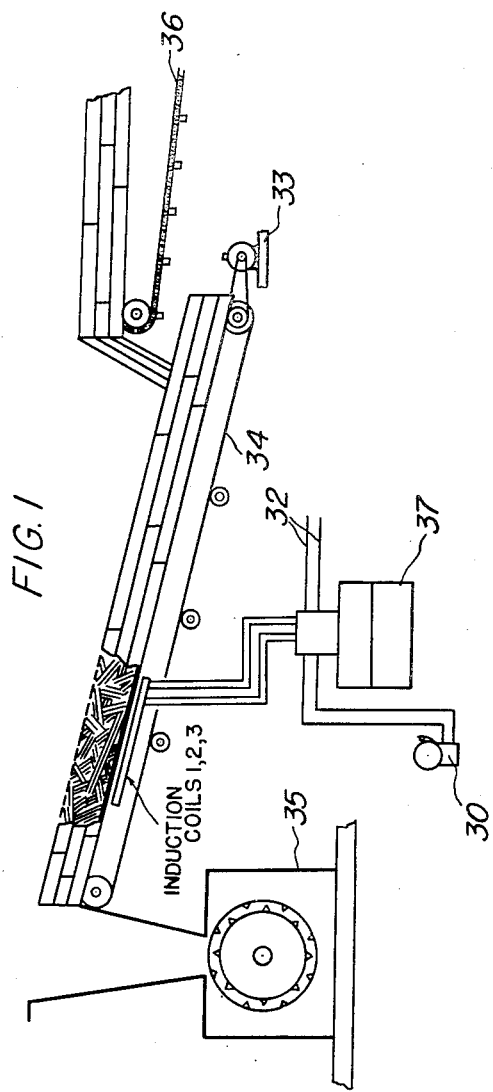
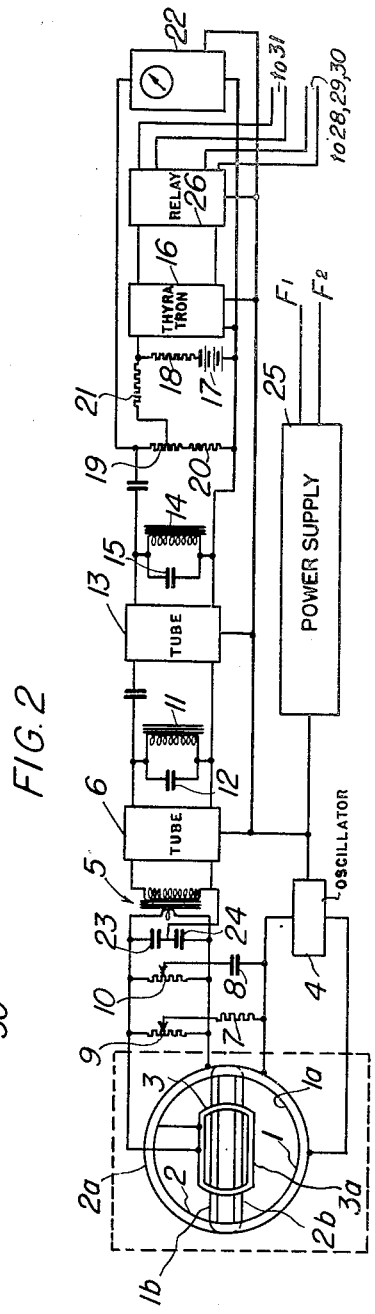
Inventor
Peyton J. Nelson
By his attorneys
Howson and Howson Inventor
Peyton J. Nelson
By his attorneys Howson and Howson

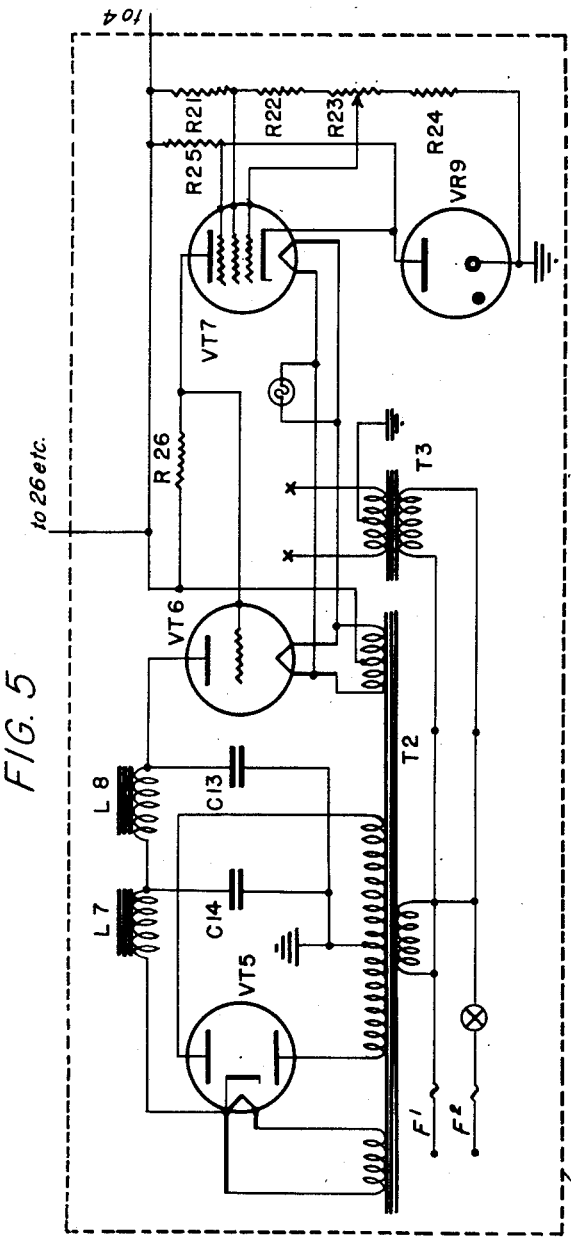
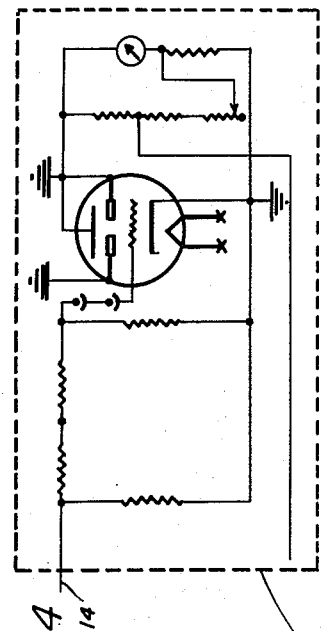

Patented Apr. 3, 1951

2,547,407

UNITED STATES PATENT OFFICE 2,547,407

APPARATUS FOR DETECTING METAL OBJECTS ON A MOVING BELT

Peyton J. Nelson, Eugene, Oreg.

Application June 18, 1948, Serial No. 33,818

5 Claims. (Cl. 175—183)

This invention relates to a metal detector and more particularly to apparatus for detecting the presence of metal objects in non-metallic material, as for example when the material is being carried on a moving belt past the detector. My invention relates to the type of metal detector which employs inductively associated coils whose inductive effect is disturbed by the presence of metal objects passing on a belt. Devices of this nature heretofore known have been cumbersome in that they have to enclose the moving belt on several sides and they are further objectionable in that they are not sufficiently sensitive to report the passage of all metal objects buried in the non-metallic material.

According to my invention the entire apparatus adjacent the belt can be placed underneath the belt so that neither the belt nor the material on it is restricted in dimension in any way. Furthermore my apparatus is extremely sensitive to the presence of metallic objects, making detection of metal at greater distances and with more certainty than apparatus heretofore known. It is characteristic of my invention that in addition to two inductively related coils there is a third or balance coil and that these three coils are arranged so as to produce a substantially null balance of the inductive effect between these two first-mentioned or main coils.

While I have shown and described my invention embodied in a metal detector for a belt carrying scrap veneer and plywood to a fuel hog preparing this waste for power-house fuel, it should be understood that my detector is easily applicable in many other ways.

In the drawings:

Figure 1 is a diagrammatic view in side elevation of equipment carrying scrap veneer and plywood to a fuel hog with my metal detector installed;

Figure 2 is a diagram of the various units of my detector shown in Fig. 1;

Figure 4 is a diagram showing the wiring of the voltage regulator

Figure 5 is a diagram of the wiring of the power supply for my detector.

Figure 3:
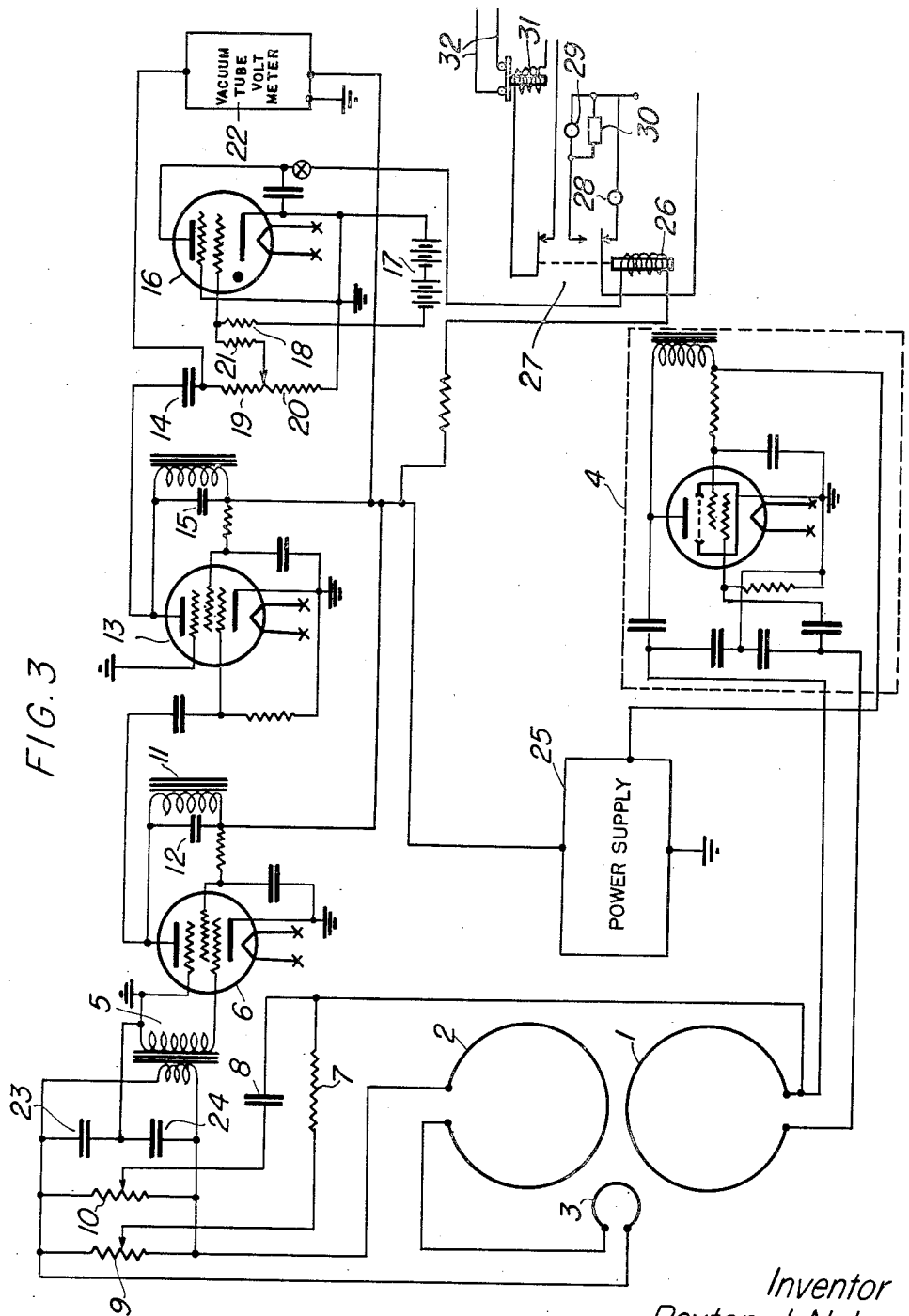
Figure 3 is a wiring diagram giving the details of the coils, tubes and relays of my detector except for the power supply and voltage regulator.

I will describe my invention being used in connection with the chopping up of scrap veneer and plywood to make power-house fuel for plywood mills. The fuel hog which chops up this scrap material can be damaged by metal objects in the scrap material. Such metal objects damage the knives and cutting surfaces of the fuel hog and also may cause injury to personnel working in the vicinity of the fuel hog. If the fuel hog is put out of operation by such metal object, the loss of time while it is shut down may be considerable. The scrap material is usually dumped onto the fuel hog from a non-metallic belt on which the scrap material lies several layers deep. The metal therefore may be out of sight of the operator and be sufficiently far above the belt so that it cannot be removed by electromagnets. I therefore propose to use an improved metal detector which will stop the conveyor and signal the operator whenever a metal object is present in the scrap veneer or plywood, thus saving the fuel hog or other expensive machinery from damage.

My metal detector has as its most important element a coil assembly in which there are a multiplicity of electric coils inductively related, an oscillator circuit to supply the alternating current to provide the induction, and an amplifier circuit for the signals given by the coils when metal objects are detected.

Referring first to the coil assembly, I have shown my invention embodied in a three-coil system where all three coils are in proximity to the area to be watched for metal objects. With my detector all three coils can be contained in a single flat, square holder which is placed just below the conveyor belt carrying the waste wood material. By having all the coils thus located underneath the belt there is no restriction on the width of the belt or on the height of the material carried by the belt. My detector is of such a nature that it provides sensitivity over a greater area and to a greater depth than has heretofore been possible.

The detecting part of my apparatus is the coil assembly. As shown in the drawings, this comprises a plurality of coils parallel to each other, i. e., either in the same or parallel planes. The coils are arranged close to each other so that they form a single flat unit. Basically the coil assembly is a three-coil system comprising two coils plus a balance coil, but it should be understood that by duplication or otherwise the number of coils can be increased without departing from the three-coil system. As shown in the drawings, there is an oscillator coil $1$, a pick-up coil $2$ of the same general character as the oscillator coil, and a balance coil $3$ connected in series with the pick-up coil (Fig. 3). As can be seen in Fig. 2 of the drawings, the oscillator coil and the pick-up coil are arranged in overlapping relation in parallel planes closely adjacent to each other and together mutually define a generally circular structure. Each of the large coils $1$, $2$, is shaped in the form of slightly more than a semi-circle with a chordal straight portion $1b$, $2b$, joining the ends of the arcs $1a$, $2a$. The two coils may be said to be superimposed in substantially the same plane with the arcs $1a$, $2a$ arranged opposite each other and the diameters or chordal portions $1b$, $2b$ overlapping or crossed over each other. By adjusting the amount of overlap the electrical inductive effect between the coils 1 and 2 is reduced substantially to zero. This gives substantially null inductive coupling. However, I desire to obtain a very fine null balance, i. e., one which gives practically complete cancellation of the inductive effects. With such an arrangement, on the one hand no voltage will normally be produced in the output of the detector, and on the other hand even the smallest metal object coming within the vicinity of the coils will produce an unbalance and thus a voltage. To achieve this fine null balance, I employ the balance coil 3 connected in series relation with the pick-up coil 2. This balance coil 3 preferably consists of only a few turns of wire and is placed along the chordal portions 1b, 2b of coils 1 and 2. As shown in the drawings, this balance coil 3 has straight portions 3a parallel to the chordal portions 1b, 2b. Thus it will be seen that the balance coil is a small coil placed in the center of the large coil diameters for the purpose of obtaining a condition of exact inductive balance between the oscillator coil 1 and the pick-up coil 2. This flat coil assembly is located immediately below the moving belt carrying the non-metallic material to be watched and is approximately the width of the belt. This is the only part of my detector which need be in the neighborhood of the belt and it therefore will be seen that in accordance with my invention there is no restriction on the width or height of material being examined, i. e., passing on the belt. This is a point of great practical value.

Alternating voltage, preferably of high frequency, is applied to the oscillator coil by the oscillator circuit to give the induction, the oscillator preferably operating at a frequency in the audio range of approximately 1100 cycles per second. The oscillator coil 1 is so connected as to form the anode tank coil of an oscillator 4. This oscillator is preferably a Colpitts type electron oscillator operating in the lower portion of the audible frequency spectrum.

The details of the oscillator circuit are shown in the lower part of Fig. 3, these parts all being conventional with a Colpitts oscillator. It might be stated that some of the energy of the oscillator is induced in the pick-up coil 2, as will be hereinafter set forth.

In Fig. 5 is shown a power supply 25 for my metal detector apparatus. This power supply is electronically stabilized and furnishes direct current voltages according to the requirements of the other circuits. It is so stabilized as to be independent of minor voltage fluctuations of the regular source of supply of the mill or city in which the detector is being used. It comprises A. C. feed lines F1, F2, transformers T2, T3, vacuum tubes VT5, VT6, VT7, voltage regulator tube VR9, condensers C13, C14, choke coils L7, L8 and resistances R21, R22, R23, R25 and R26, of which R23 is variable. The arrangement shown constitutes a highly stabilized full-wave rectifier which provides highly stable D. C. voltages for the plates and screen grids of the tubes of the other circuits.

Turning now to the relation between the oscillator coil 1 and the pick-up coil 2, it will be noted that since the coils 1, 2 and 3 possess both a capacitative component and a resistive component, a resistor 7 and condenser 8 are connected between the anode side of the oscillator coil 1 and the other two coils to provide means for cancelling out these resistive and capacitative components. The resistor 7 and condenser 8 are arranged in parallel and are adjustable through balancing potentiometers 9 and 10 across the circuit of coils 2 and 3.

The amplifier circuit is connected to the circuit of the pick-up coil 2 and balance coil 3 by an amplifying and coupling transformer 5 to which are connected, in cascade, amplifier tubes 6 and 13, as shown in Fig. 3. The anode circuit of the first amplifier tube 6 is resonated at the frequency of the oscillator circuit 4 by inductance 11 and condenser 12. This circuit is capacitatively coupled to the circuit of tube 13 whose anode circuit is likewise resonated at the frequency of the oscillator 4 by a second inductance 14 and condenser 15. In order to make the amplifier circuit a high-gain circuit, the tubes 6 and 13 are high mu factor amplifying tubes, preferably pentode tubes of high mu television type. These, taken in connection with the fact that the pick-up coil 2 is resonated to the proper frequency by condensers 23 and 24, give the necessary kind and quantity of amplification when used with the remaining elements next to be described. It might be stated at this point that the balance coil 3, being of very few turns of small diameter, will function to receive an out-of-phase voltage from oscillator coil 1 to assist in balancing the coil system regardless of whether it is connected in series aiding or in opposition to pick-up coil 2. In other words, coil 3 merely acts as a Vernier coil.

I next provide an electronic switch to which the means for signalling the operator and stopping the motor of the moving belt are connected. For an electronic switch I have shown in the drawings a grid-controlled thyratron 16, i. e., a biased grid-controlled hot cathode gas-filled arc tube 16. The anode circuit of the second amplifier tube 13 is capacitatively coupled to the input circuit of thyratron 16. The control grid of the thyratron is biased several times below cut-off by a bias battery 17 acting through a bias resistor 18. According to my invention I have obtained control over the mass of the smallest metal object which will operate the thyratron by means of a sensitivity control 19 which shunts the input from the amplifier circuit to the thyratron through a resistor 20. This sensitivity control 19 is a potentiometer. The resistor 20 has a resistance which is specifically placed in this circuit so that even at the minimum setting of the sensitivity control, sufficient sensitivity will still be available to operate the detector on metal objects of such size as might damage the machinery of the mill, for instance, the fuel hog. In this way the smallest metal object on the belt which will operate the thyratron can be controlled.

I also provide a resistance 21 connected between the grid of the thyratron 16 and the sensitivity control 19. With this arrangement, signal voltages of a predetermined amplitude will cause certain peak voltages to be impressed on the grid of the thyratron 16 through the resistance 21. When these instantaneous peak voltages reach a certain amplitude greater than the bias voltage being applied by the bias battery 17 through the bias resistance 18, the thyratron 16 will become conductive and will pass a comparatively heavy current through its own anode circuit. Thus the thyratron, which is a gas-filled tube that is normally non-conductive, is "triggered" or fired whenever the input voltage exceeds a certain value which is dependent on the bias of battery 17.

In the anode circuit of the thyratron is a relay 26 which controls a signal circuit and a motor-controlling relay circuit. When the thyratron is not conducting, i. e., when there is no signal from the detector, the relay 26 is deenergized and the relay contacts 27 are as shown in Fig. 3, there being a completed circuit through a green signal light 28, and a completed circuit through the winding of relay 31 so that the latter relay is energized and the circuit 32 of the conveyor drive motor is closed. When the thyratron becomes conductive in response to a signal from the detector, the relay 26 is energized, disconnecting the green light 28 and connecting a red signal light 29 and a signal bell 30. At the same time, the relay 31 is deenergized, opening the motor circuit 32.

My apparatus, except for the induction coils 1, 2 and 3, may be put in a container 37 (Fig. 1) near the operator in charge of the fuel hog.

An electronic tube voltmeter and voltage stabilizer 22 is provided in conjunction with the amplifier circuit as a sensitive means of adjusting the balancing controls or potentiometers 9 and 10 for the proper operation of the unit. While the wiring diagram of this voltage regulator is shown in Fig. 4 and is conventional, its use to regulate the null balance between the three coils 1, 2 and 3 by being connected to the amplifier circuit is a valuable feature in obtaining the necessary sensitivity in my metal detector.

It will be seen that in a metal detector made in accordance with my invention, not only have I freed the conveyor belt and the material on it from all dimensional restrictions, but my form of air core high-frequency inductive apparatus provides sensitivity which operates over a large area at some distance from the coils and which is extremely sensitive to even the smallest amount of metal whether the material to be detected is magnetic or non-magnetic.

What I claim:

1. Apparatus for detecting metal objects on a moving belt, in which there is a pair of similar coils of substantially semi-circular shape arranged in overlapping close relation so as to mutually define a generally circular structure with substantially parallel chordal portions, in combination with a third coil having portions adjacent to both said chordal portions, said three coils constituting a flat assembly in proximity to the lower side of the belt, means for applying an alternating voltage to one of the first-mentioned coils, means connecting the other of the first-mentioned coils and said third coil in series, the arrangement of said coils being adapted to produce substantially a null balance of the inductive effects therebetween, and means for deriving voltage through the series-connected coils whenever said balance is disturbed by the presence of a metal object on the belt in proximity to to the coils.

2. In an apparatus for detecting the presence of metal objects in non-metallic material on a moving belt in accordance with claim 1, the provision of an electron oscillator operating at a frequency in the audio range of approximately 1100 cycles per second to provide the alternating voltage in the oscillator coil, and an amplifier circuit deriving from the pick-up and balance coils a voltage produced by a disturbance of said balance due to a metal object on the belt.

3. In an apparatus for detecting the presence of metal objects in non-metallic material on a moving belt in accordance with claim 1, the connection of the balance coil in series with the pick-up coil and the provision of an electronic tube voltmeter in conjunction with the amplifier circuit to regulate the null balance between the coils.

4. In apparatus for detecting metal objects in non-metallic material on a moving belt, a flat coil assembly comprising three electric air core coils arranged parallel in inductive relation to each other, said coils being an oscillator coil, a pick-up coil and a balance coil, said oscillator coil and pick-up coil being in overlapping relation and mutually defining a substantially circular structure and said balance coil having portions adjacent overlapping portions of said oscillator and pick-up coils, said assembly being located below the belt and approximately the width of the latter, in combination with means for applying a high frequency alternating voltage to the oscillator coil, said three coils being so related as to produce a substantially null balance of the inductive effects therebetween, and an amplifier circuit deriving from the pick-up and balance coils a voltage produced by a disturbance of said balance due to a metal object on the belt, whereby the detector does not restrict or limit the shape or quantity of material passing over the belt.

5. Apparatus for detecting the presence of metal objects on a moving belt, in which there is a pair of similar coils of substantially semi-circular shape arranged in overlapping close relation so as to mutually define a generally circular structure with substantially parallel chordal portions, in combination with a third coil having portions adjacent to said chordal portions, means for applying an alternating voltage to one of the first-mentioned coils, means connecting the other of the first-mentioned coils and said third coil in series, the arrangement of said coils being adapted to produce substantially a null balance of the inductive effects therebetween, and means for deriving voltage through the series connected coils whenever said balance is disturbed by the presence of a metal object in proximity to the coils, said assembly being located below the belt and approximately the width of the latter, whereby the detector does not restrict or limit the shape or quantity of material passing over the belt.

PEYTON J. NELSON.

REFERENCES CITED

The following references are of record in the file of this patent:

UNITED STATES PATENTS

| Number | Name | Date |
| --- | --- | --- |
| Re. 21,003 | Kneer et al. | Feb. 14, 1939 |
| 1,640,524 | Augustine | Aug. 30, 1927 |
| 2,007,772 | Sams et al. | July 9, 1935 |
| 2,129,058 | Hedden | Sept. 6, 1938 |
| 2,228,294 | Wurzbach | Jan. 14, 1941 |
| 2,237,254 | Broekhuysen | Apr. 1, 1941 |
| 2,432,390 | Darby | Dec. 9, 1947 |
| 2,438,197 | Wheeler | Mar. 23, 1948 |
| 2,451,596 | Wheeler | Oct. 19, 1948 |
| 2,485,579 | Elliott | Oct. 25, 1949 |
| 2,489,920 | Michel | Nov. 29, 1949 |
| 2,502,626 | Mages | Apr. 4, 1950 |